(12) United States Patent
Ye et al.

(10) Patent No.: US 12,429,984 B2
(45) Date of Patent: Sep. 30, 2025

(54) INFRARED TOUCH SCREEN INCLUDING AN INFRARED FILTER STRIP, AND DISPLAY DEVICE

(71) Applicants: SHENZHEN HUASHENG SOFTWARE TECHNOLOGY CO., LTD., Guangdong (CN); TCL BUSINESS INFORMATION TECHNOLOGY (HUIZHOU) CO., LTD., Guangdong (CN)

(72) Inventors: Xiongbo Ye, Guangdong (CN); Yiming Liu, Guangdong (CN); Hua Huang, Guangdong (CN)

(73) Assignees: SHENZHEN HUASHENG SOFTWARE TECHNOLOGY CO., LTD., Guangdong (CN); TCL BUSINESS INFORMATION TECHNOLOGY (HUIZHOU) CO., LTD., Guangdong (CN)

( * ) Notice: Subject to any disclaimer, the term of this patent is extended or adjusted under 35 U.S.C. 154(b) by 0 days.

(21) Appl. No.: 18/684,669

(22) PCT Filed: Aug. 8, 2022

(86) PCT No.: PCT/CN2022/110934
§ 371 (c)(1),
(2) Date: Feb. 17, 2024

(87) PCT Pub. No.: WO2023/045595
PCT Pub. Date: Mar. 30, 2023

(65) Prior Publication Data
US 2025/0123719 A1    Apr. 17, 2025

(30) Foreign Application Priority Data
Sep. 26, 2021  (CN) .......................... 202111128206.9

(51) Int. Cl.
*G06F 3/042* (2006.01)
*G02F 1/1333* (2006.01)

(52) U.S. Cl.
CPC ........ *G06F 3/0421* (2013.01); *G02F 1/13338* (2013.01)

(58) Field of Classification Search
None
See application file for complete search history.

(56) References Cited

U.S. PATENT DOCUMENTS

2010/0156828 A1* 6/2010 Choi ..................... G06F 3/0428
345/173

FOREIGN PATENT DOCUMENTS

CN      202694301 U  *  1/2013
CN      102968223 A  *  3/2013  ........... G06F 3/0428
(Continued)

OTHER PUBLICATIONS

International Search Report in International application No. PCT/CN2022/110934, mailed on Oct. 21, 2022.
(Continued)

*Primary Examiner* — Kirk W Hermann
(74) *Attorney, Agent, or Firm* — PV IP PC; Wei Te Chung

(57) ABSTRACT

The infrared touch screen comprises: a cover plate having a light incident surface and a light emergent surface that are connected by a first side face; an infrared light source disposed on a side of the light incident surface of the cover plate; a first frame; and a first infrared filter strip that is connected to the first frame and is disposed on a side of a first side surface of the cover plate, the first infrared filter strip being used for converting at least part of infrared light emitted by the infrared light source to propagate in a (Continued)

direction parallel to the light emergent surface on a side of the light emergent surface of the cover plate.

18 Claims, 5 Drawing Sheets

(56) References Cited

FOREIGN PATENT DOCUMENTS

| CN | 203720810 U | | 7/2014 | |
|---|---|---|---|---|
| CN | 110806817 A | * | 2/2020 | ............. G06F 3/042 |
| CN | 112114692 A | | 12/2020 | |
| CN | 112363645 A | * | 2/2021 | ........... G06F 3/0416 |
| CN | 215599673 U | | 1/2022 | |
| CN | 215932602 U | | 3/2022 | |

OTHER PUBLICATIONS

Written Opinion of the International Search Authority in International application No. PCT/CN2022/110934, mailed on Oct. 21, 2022.

* cited by examiner

INFRARED TOUCH SCREEN INCLUDING AN INFRARED FILTER STRIP, AND DISPLAY DEVICE

CROSS REFERENCE TO RELATED APPLICATION

This application is a National Stage of International Application No. PCT/CN2022/110934. filed on Aug. 8, 2022, which claims priority to Chinese Application No. 202111128206.9, filed on Sep. 26, 2021, both of which are incorporated herein by reference in its entirety herein.

FIELD

The present disclosure generally relates to the field of touch technology, and in particular to an infrared touch screen and a display device.

BACKGROUND

An infrared touch screen is a touch screen formed by providing an infrared light source and an infrared receiver on a surface of a screen. When any one kind of touching object touches the surface of the screen and blocks infrared light emitted from the infrared light source to the infrared receiver, the infrared touch screen can detect an operation of touching the screen by the touching object.

Compared with the capacitive touch screen, the infrared touch screen has advantages of low manufacturing cost, convenient installation, high anti-violence, high reliability, and the like. Therefore, the infrared touch screen is widely used in various fields. However, the frame of a conventional infrared touch screen is too high relative to the surface of the screen, which affects the overall visual perception of the infrared touch screen.

TECHNICAL PROBLEM

According to an embodiment of the present disclosure, it is provided an infrared touch screen and a display device to solve a problem that the frame of the infrared touch screen is too high relative to the surface of the screen.

TECHNICAL SOLUTION

In a first aspect, according to an embodiment of the present disclosure, an infrared touch screen includes:
a cover plate having a light incident surface and a light emergent surface, the light incident surface and the light emergent surface being opposite and connected by a first side surface;
an infrared light source on a side of the light incident surface of the cover plate, the infrared light source being configured to emit infrared light;
a first frame; and
a first infrared filter strip on a side of the first side surface of the cover plate, the first infrared filter strip having a first end and a second end, the first end and the second end being opposite, the first end being connected to the first frame, the second end being on the first side surface, a first protruding part being on a side of the second end facing away from the infrared light source, the first protruding part being capable of emitting at least part of the infrared light that the infrared light source emits into the first infrared filter strip, in a direction parallel to the light emergent surface.

In a second aspect, according to an embodiment of the present disclosure, an infrared touch screen includes:
a cover plate having a light incident surface and a light emergent surface, the light incident surface and the light emergent surface being opposite and connected by a second side surface;
an infrared receiver on a side of the light incident surface of the cover plate;
a second frame; and
a second infrared filter strip wholly on a side of a second side surface of the cover plate, the second infrared filter strip has a third end and a fourth end, the third end being connected to the second frame, a second protruding part being on a side of the fourth end facing away from the second side surface, the fourth end being provided with a second protruding part on the side facing away the infrared receiver, the second protruding part being capable of receiving at least part of the infrared light propagating in a direction parallel to the light emergent surface and emitting towards the infrared receiver.

In to a third aspect, according to an embodiment of the present disclosure, a display device includes the infrared touch screen according to the first aspect or the second aspect.

BENEFICIAL EFFECT

According to the infrared touch screen according to an embodiment of the present disclosure, an infrared light source is disposed on a side of a light incident surface of a cover plate. Infrared light emitted by the infrared light source can propagate on a side of the light emergent surface of the cover plate in a direction parallel to the light emergent surface, after a direction change by a first infrared filter strip. The part of the infrared light can be emitted to an infrared receiver. Compared to that the infrared light source is disposed on the side of the light emergent surface of the cover plate, in the infrared touch screen according to an embodiment of the present disclosure, the infrared light source is disposed on the side of light incident surface of the cover plate, so that a protruding part of a first frame relative to the light emergent surface of the cover plate does not need to reserve too much thickness to install the infrared light source. Further, according to an embodiment of the present disclosure, a thickness of the protruding part of the frame of the infrared touch screen relative to the light emergent surface of the cover plate is decreased.

DETAILED DESCRIPTION

Technical solutions in embodiments of the present disclosure will be clearly and completely described in conjunction with the accompanying drawings of embodiments of the present disclosure. It will be apparent that the described embodiments are only part of embodiments of the present disclosure, and not all embodiments. Based on embodiments in the present disclosure, all other embodiments obtained by those skilled in the art without involving any inventive effort are within the scope of the present disclosure.

According to an embodiment of the present disclosure, it is provided an infrared touch screen and a display device to solve a problem that a frame of an infrared touch screen 100 protrudes too high relative to a surface of a screen.

Figure 1:
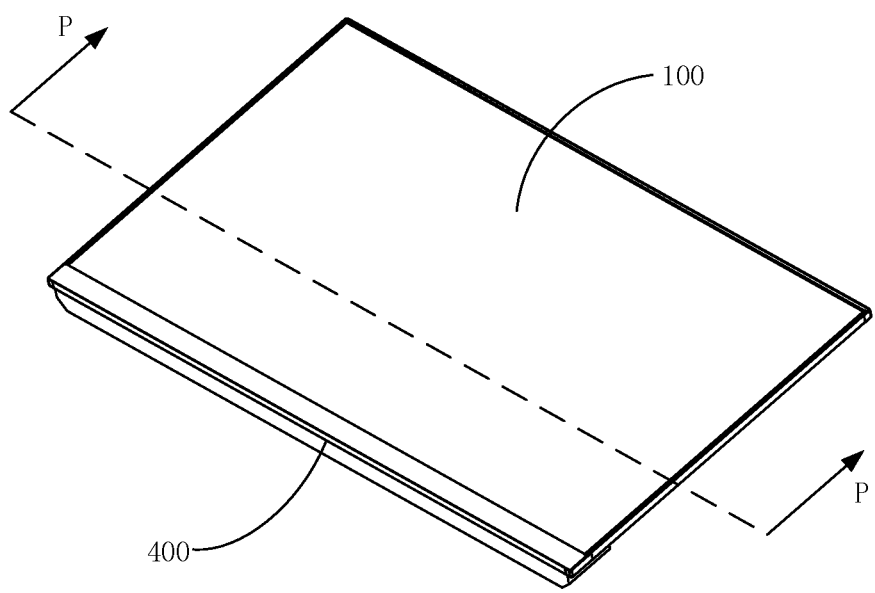
FIG. 1 is a structural schematic diagram of a display device according to an embodiment of the present disclosure.

Referring to FIG. 1, FIG. 1 is a structural schematic diagram of a display device according to an embodiment of the present disclosure. According to an embodiment of the present disclosure, the infrared touch screen 100 may be used in a display device. The display device may include any product or component having a display function, such as a liquid crystal display panel, an electronic paper, a mobile phone, a tablet computer, a television, a display, a notebook computer, a digital photo frame, and a navigator. The particular structure of the display device is not limited in embodiments of the present disclosure. Of course, the infrared touch screen 100 according to an embodiment of the present disclosure may also be used separately without being applied to a display device, which is not limited in an embodiment of the present disclosure.

Figure 2:
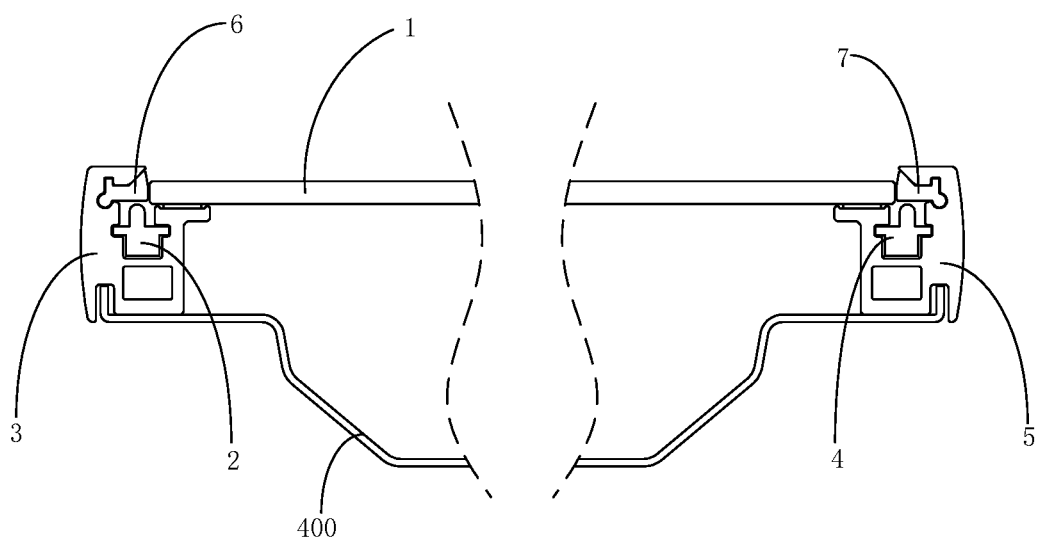
FIG. 2 is a cross-sectional view of an infrared touch screen of the display device shown in FIG. 1 in a P-P direction.

Referring to FIG. 2, FIG. 2 is a cross-sectional view of an infrared touch screen of the display device shown in FIG. 1 in a P-P direction. In an embodiment of the present disclosure, the infrared touch screen 100 may include a cover plate 1, an infrared light source 2, a first frame 3, an infrared receiver 4, and a second frame 5.

Illustratively, the cover plate 1 has a light incident surface 11 and a light emergent surface 12. The light incident surface 11 and the light emergent surface 12 are opposite. The cover plate 1 may be an acrylic cover plate, a glass cover plate, or other cover plate having a light-transmitting property. An infrared light source 2 and an infrared receiver 4 are opposite. The infrared light source 2 is fixed to the display device by a first frame 3, and is configured to emit infrared light. The infrared receiver 4 is fixed to the display device by a second frame 5, and is configured to receive the infrared light emitted by the infrared light source 2. At this time, the infrared light emitted by the infrared light source 2 is emitted towards to the infrared receiver 4 outside a side with the light emergent surface 12 on the cover plate 1. When the user's finger or other touching object touches the light emergent surface 12 of the cover plate 1, the infrared light emitted by the infrared light source 2 to the infrared receiver 4 is blocked. Then a touch position where the user's finger or other touching object touches the cover plate 1 can be detected. In an embodiment of the present disclosure, multiple groups of intercooperating infrared light sources 2 and infrared receivers 4 may also be provided. Assume that when a beam of infrared light is formed between the infrared light source 2 and the infrared receiver 4 of each group, multiple beams of infrared light may be arranged in a crisscross manner so as to form an infrared light network interwoven on the surface of the light emergent surface 12. Therefore, when the user's finger or other touching object touches the light emergent surface 12, infrared light in a lateral direction and a longitudinal direction in the infrared light network is blocked, so that a particular touch position of the user or other touching object on the light emergent surface 12 of the cover plate 1 can be quickly disposed.

Figure 3:
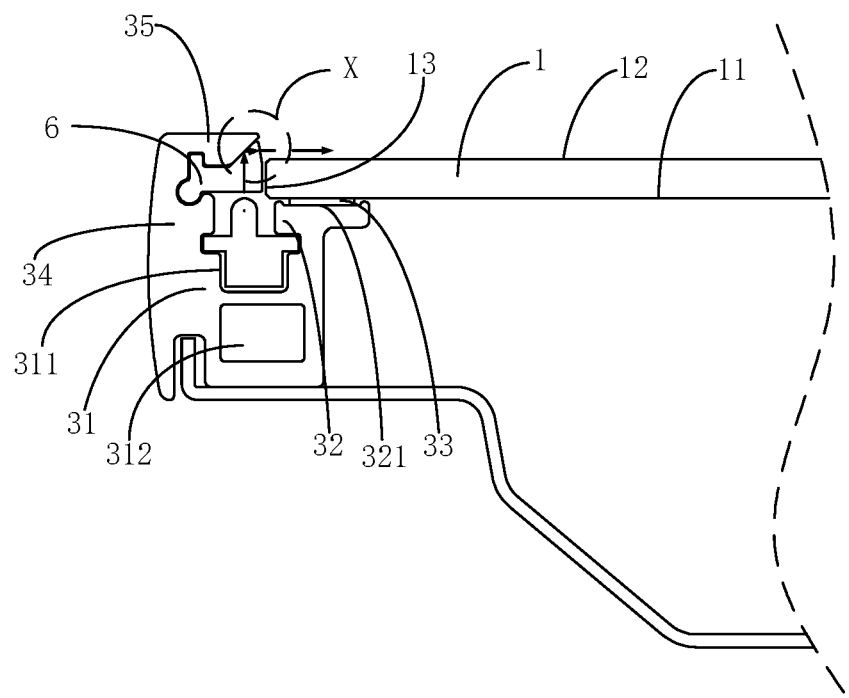
FIG. 3 is a structural schematic diagram of a side of an infrared light source in the infrared touch screen shown in FIG. 2.
Figure 4:
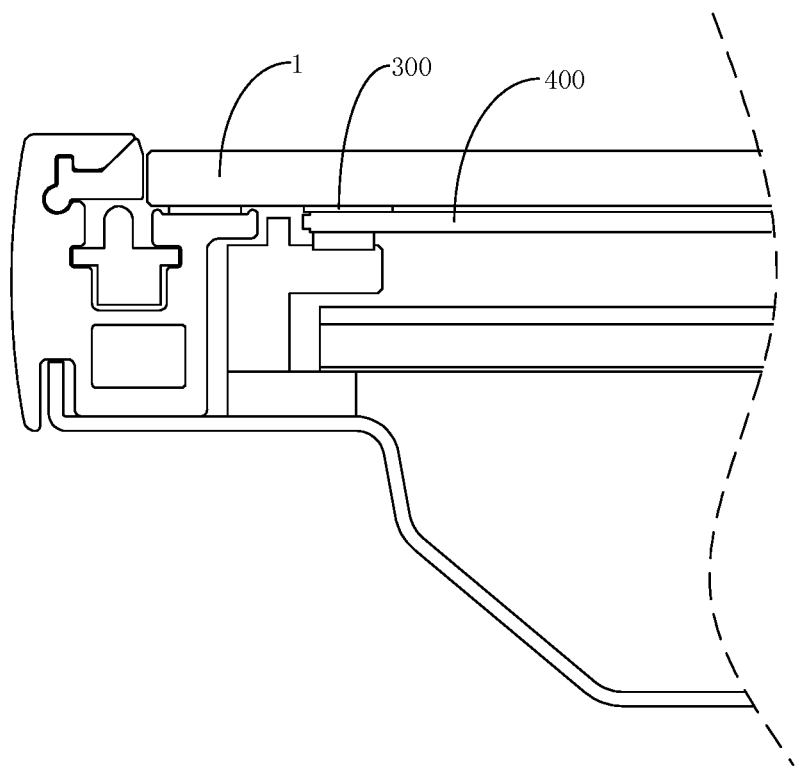
FIG. 4 is a structural schematic diagram in which the side of the infrared light source in the infrared touch screen shown in FIG. 3 is connected to a liquid crystal module.

Referring to FIGS. 3 and 4, FIG. 3 is a structural schematic diagram of a side of the infrared light source in the infrared touch screen shown in FIG. 2, and FIG. 4 is schematic diagram in which the side of the infrared light source in the infrared touch screen shown in FIG. 3 is connected to the liquid crystal module. It can be understood that in related art, the cover plate 1 on a surface of a display component of the display device to protect the display component of the display device. Particularly, the light incident surface 11 of the cover plate 1 is attached to the display module so that patterns, contents and the like displayed on the display module can be observed in a region other than the light emergent surface 12 of the cover plate 1 after passing through the light incident surface 11 and the light emergent surface 12 of the cover plate 1 in sequence. For example, as shown in FIG. 3, the liquid crystal module 200 of the display module may be adhesively fixed to the light incident surface 11 of the cover plate 1 by VHB buffer sealant 300. Generally, space on a side of the light incident surface 11 of the cover plate 1 is defined as an in-screen space, and space on a side of the light emergent surface 12 of the cover plate 1 is defined as an out-of-screen space. Both the infrared light source 2 and the infrared receiver 4 are wholly disposed on the side of the light emergent surface 12 of the cover plate 1, that is, in the out-of-screen space.

Thus, in related art, on the one hand, in order to install and fix the infrared light source 2, at least part of the first frame 3 is disposed on the side of the light emergent surface 12 of the cover plate 1, that is, at least part of the first frame 3 is disposed in the out-of-screen space of the cover plate 1, and this part requires sufficient thickness to install the infrared light source 2. On the other hand, in order to install the infrared receiver 4, at least part of the second frame 5 is disposed on the side of the light emergent surface 12 of the cover plate 1, that is, at least part of the second frame 5 is disposed in the outside space, and this part requires sufficient thickness to install the infrared receiver 4.

Therefore, in related art, due to the limitation of the volume of the infrared light source 2, it is difficult to further reduce the thickness of the protruding part of the first frame 3 of the infrared touch screen 100 relative to the cover plate 1. Due to the limitation of the volume of the infrared receiver 4, it is difficult to further reduce the thickness of the protruding part of the second frame 5 of the infrared touch screen 100 relative to the cover plate 1. However, when the thickness of the protruding part of the first frame 3 relative to the cover plate 1 and the thickness of the protruding part of the second frame 5 relative to the cover plate 1 are too great, the user's overall visual perception of the infrared touch screen is reduced and too much space is occupied. In addition, when the thickness of the protruding part of the first frame 3 relative to the cover plate 1 and the thickness of the protruding part of the second frame 5 relative to the cover plate 1 are too great, the display contents of the display assembly of the in-screen space are viewed through the cover plate 1, visual perception when viewing the display content of the display components in the in-screen space through cover plate 1 is poor.

As shown in FIG. 2, in order that the thickness of the protruding part of the first frame 3 relative to the cover plate 1 can be further reduced, according an embodiment of the present disclosure, the infrared light source 2 of the infrared touch screen 100 may be disposed on a side of the cover plate 1 having the light incident surface 11, that is, the infrared light source 2 is disposed in the in-screen space of the cover plate 1. Illustratively, the infrared touch screen 100 may also include a first infrared filter strip 6. The first infrared filter strip 6 is capable of filtering all light beams other than infrared light directed thereto, so that only the infrared light can pass through the first infrared filter strip 6. The infrared light emitted by the infrared light source 2 is directed towards the first infrared filter strip 6 and undergoes a direction change within the first infrared filter strip 6. Finally, according to an embodiment of the present disclosure, the infrared touch screen 100 is provided with the first infrared filter strip 6, so that at least part of the infrared light emitted by the infrared light source 2 propagates outside a side of the light emergent surface 12 of the cover plate 1 in a direction parallel to the light emergent surface 12.

It can be understood that since the infrared light source 2 is disposed on a side of the cover plate 1 having the light incident surface 11, the thickness of the protruding part of the first frame 3 relative to the light emergent surface 12 of the cover plate 1 can be greatly reduced. The first frame 3 is for installing and fixing the infrared light source 2.

Figure 5:
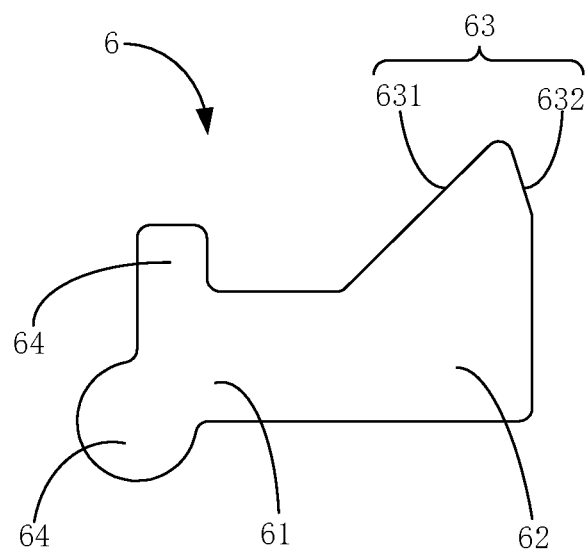
FIG. 5 is a structural schematic diagram of a first infrared filter strip in the infrared touch screen shown in FIG. 3.

Referring to FIG. 5, FIG. 5 is a structural schematic diagram of a first infrared filter strip in the infrared touch screen shown in FIG. 3. In the following, a particular structure of the first infrared filter strip 6 according to an embodiment of the present disclosure will be described in further detail in conjunction with the accompanying drawings.

As shown in FIG. 3, the light incident surface 11 and the light emergent surface 12 of the cover plate 1 may be connected by a first side surface 13. The first infrared filter strip 6 is wholly disposed on a side of the cover plate 1 having the first side surface 13. The first infrared filter strip 6 has a first end 61 and a second end 62. The first end 61 and the second end 62 are opposite. The first end 61 is connected to the first frame 3, so that the first end 61 is directly or indirectly fixed to the display device by the first frame 3. The second end 62 is disposed on the first side surface 13. For example, the second end 62 may contact the first side surface 13, or there is a gap between the second end with the first side surface, so that the cover plate 1 and the first infrared filter strip 6 are arranged side by side in a plane parallel to the light emergent surface 12. A first protruding part 63 is disposed on a side of the second end 62 facing away from the light incident surface 11. At least part of the infrared light emitted by the infrared light source 2 into the first infrared filter strip 6, can be emitted by the first protruding part 63 in a direction parallel to the light emergent surface 12.

Illustratively, as shown in FIG. 5, the first protruding part 63 may have a first total reflective surface 631 and a first refractive surface 632. The first total reflecting surface 631 is disposed on a side of the first protruding part 63 away from the first side surface 13, and is inclined to the light emergent surface 12, so that at least part of the infrared light emitted by the infrared light source 2 into the first infrared filter strip 6 can be totally reflected towards the cover plate 1. The first refractive surface 632 is disposed between the first total reflective surface 631 and the first side surface 13, and is inclined to the light emergent surface 12, so that at least part of the infrared light totally reflected by the first total reflective surface 631 can be refracted to emerge from the first infrared filter strip 6 in a direction parallel to the light emergent surface 12.

Figure 6:
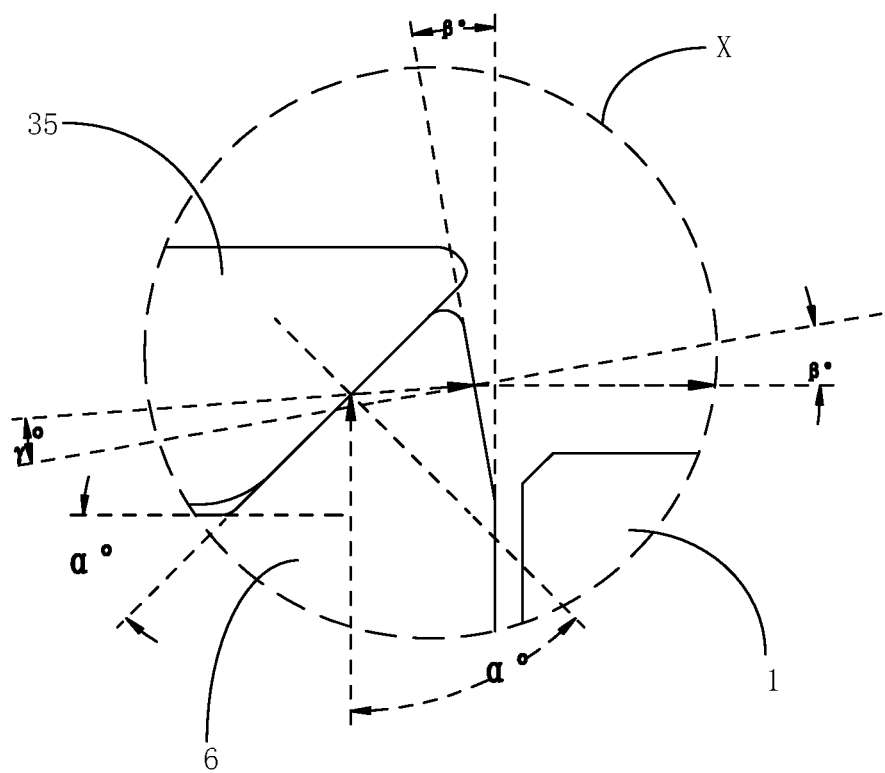
FIG. 6 is a partially enlarged view at X of the structural schematic diagram of the side of the infrared light source in the infrared touch screen shown in FIG. 3.

Referring to FIG. 6, FIG. 6 is a partially enlarged view at X of a structural schematic diagram on a side of the infrared light source in the infrared touch screen shown in FIG. 3. According to an embodiment of the present disclosure, a refractive index of the first infrared filter strip 6 is assumed to be $N_1$. The light emergent surface 12 of the cover plate 1 is taken as a first reference surface, and a plane perpendicular to the first reference surface is taken as a second reference surface. For example, the second reference surface may be the first side surface 13. The first total reflective surface 631 may be disposed inclined to the first reference surface, that is, the light emergent surface 12 of the cover plate 1. An angle between the first total reflective surface 631 and the light emergent surface 12 is set to be $\alpha°$. $\alpha°$ is greater than a total reflection critical angle of the first infrared filter strip 6, that is, $\alpha > \arcsin(1/N_1)$. An angle between the first refractive surface 632 and the second reference surface is $\beta°$, that is, an angle between the first refractive surface 632 and the first side surface 13 is $\beta°$. When an incident angle of a first initial infrared light towards the first total reflective surface 631 is $\alpha°$, the first initial infrared light is totally reflected by the first total reflective surface 631 to form a first intermediate infrared light, and an incident angle of the first intermediate infrared light towards the first refractive surface 632 is $\gamma°$. Since $\gamma°$ is less than $\alpha°$, that is, the incident angle of the first intermediate infrared light towards the first refractive surface 632 is less than the total reflection critical angle of the first infrared filter strip 6. Therefore, an emergence angle of the first intermediate infrared light after refracted at the first refractive surface 632 is $\beta°$. $N_1 = \sin\beta/\sin\gamma$, $\gamma = 90 + \beta - 2\alpha$. For example, $N_1 = 1.58$. At least part of the light emitted by the infrared light source 2 into the first infrared filter strip 6 is directed towards the first total reflective surface 631 in a direction perpendicular to the light emergent surface 12. The emergent light parallel to the light emergent surface 12 can be formed after a change by the first infrared filter strip 6.

Of course, according to an embodiment of the present disclosure, the first protruding part 63 may also include a first reflective surface and the first refractive surface 632. The first reflective surface is disposed on a side of the first protruding part 63 away from the first side surface 13, and is provided with a reflective layer made of a reflective material such as a silver reflective thin film, so that at least part of the infrared light emitted by the infrared light source 2 into the first infrared filter strip 6 is directed towards a direction of the cover plate 1. The first refractive surface 632 is disposed between the first total reflective surface 631 and the first side surface 13, and at least part of the infrared light totally reflected by the first total reflective surface 631 can be refracted to exit the first infrared filter strip 6 in a direction parallel to the light emergent surface 12.

According to an embodiment of the present disclosure, the particular structure of the first protruding part 63 is not limited. A technical solution in which at least part of the infrared light emitted by the infrared light source 2 into the first infrared filter strip 6 is directed into a direction parallel to the light surface 12 is within the protection scope of the present disclosure.

As shown in FIG. 3, according to an embodiment of the present disclosure, the first frame 3 may have a first installing part 31. The first installing part 31 is provided with a third sliding groove 311 with an opening towards the first infrared filter strip 6. The third sliding groove 311 is a through groove parallel to the light emergent surface 12 in a length direction. The infrared light source 2 includes a first circuit board. The first circuit board is slidably connected to the third sliding groove 311 and can slide in a direction parallel to the light emergent surface 12 within the third sliding groove 311. Therefore, in an installation process, the infrared light source 2 can be directly slid into the third sliding groove 311 at the opening at an end of the third sliding groove 311, so that the infrared light source 2 can be quickly installed within the first installation part 31. It can be seen that the infrared touch screen 100 according to an embodiment of the present disclosure has an advantage of being easy to assemble.

In an embodiment of the present disclosure, as shown in FIG. 3, the first installing part 31 may be provided with a first lightening hole 312 to reduce the overall weight of the infrared touch screen 100.

As shown in FIG. 3, the first frame 3 may have a second installing part 32. For example, the second installing part 32 is provided on a side of the first installing part 31 facing the light incident surface 11. The second installing part 32 is adhered to the light incident surface 11 of the cover plate 1 by the first double-sided adhesive 33.

As shown in FIG. 3, in an embodiment of the present disclosure, the second installing part 32 may be provided with a first adhesive groove 321 on a side of facing the light incident surface 11. A side of the first double-sided adhesive 33 facing away from the light incident surface 11 is adhered to a side wall forming the first adhesive groove 321. A side of the first double-sided adhesive 33 facing the light incident surface 11 is adhered to the light incident surface 11. When a thickness of the first double-sided adhesive 33 is equal to a depth of the first adhesive groove 321, after adhesion, the cover plate 1 can be exactly pressed against a surface of the second installing part 32 facing the light incident surface 11, so as to prevent the first double-sided adhesive 33 causing the cover plate 1 to be locally warped relative to the second installing part 32.

As shown in FIG. 3, the first frame 3 may have a third installing part 34. The third installing part 34 and the second installing part 32 may be provided on a same side of the first installing part 31 and symmetrically provided on both sides of the opening of the third sliding groove 311. The third installing part 34 is provided with a first sliding groove facing the first side surface 13 of the cover plate 1. A first end 61 of the first infrared filter strip 6 is slidably installed within the first sliding groove.

As shown in FIG. 5, the first end 61 may be provided with at least two first sliding parts 64. The at least two first sliding parts are different in shape. The first sliding groove may include two through grooves which are same in cross section as the two first sliding parts 64 respectively and are parallel to the light emergent surface 12 in a length direction, so that the first end 61 can slide in a direction parallel to the light emergent surface 12 within the first sliding groove. Therefore, in an installation process, the first infrared filter strip 6 can be slid directly into the first sliding groove at an opening at an end of the first sliding groove, so that the first infrared filter strip 6 can be quickly installed into the third installing part 34. It can be seen that the infrared touch screen 100 according to an embodiment of the present disclosure has the advantage of being easy to assemble.

As shown in FIG. 5, there are two first sliding parts 64. One of the two first sliding parts 64 is circular, and the other of the two first sliding parts 64 is square. It can be understood that, in a use process, the first infrared filter strip 6 can be limited from multiple angles by forming a sliding connection with the third installing part 34 by two first sliding parts 64 having different shapes, so that the first infrared filter strip 6 only has a degree of freedom of sliding within the third installing part 34. It can be seen that in the infrared touch screen 100 according to an embodiment of the present disclosure, the first infrared filter strip 6 is more securely installed and is less prone to displacement. Finally, the change angle of the first infrared filter strip 6 to the infrared light is more accurate, so as to improve the accuracy of the infrared touch screen 100 according to an embodiment of the present disclosure.

As shown in FIG. 3, the first frame 3 may include a first shielding part 35. The first shielding part 35 is connected to an end of the third installing part 34 away from the second installing part 32. The first shielding part 35 and the infrared light source 2 are disposed opposite to each other on both sides of the first infrared filter strip 6, so that the first shielding part 35 covers a side of the first infrared filter strip 6 facing away from the light incident surface 11 of the cover plate 1. That is, the first shielding part 35 is disposed in the out-of-screen space.

On the one hand, by the first shielding part 35, it is possible to prevent external infrared light from being incident into the first infrared filter strip 6 to some extent, so as to interfere with the operation of the infrared touch screen 100.

On the other hand, since the first infrared filter strip 6 is wholly disposed on a side of the cover plate 1 having the first side surface 13, the first shielding part 35 is also wholly provided on the side of the cover plate 1 having the first side surface 13. Therefore, the first shielding part 35 may not shield the cover plate 1, so that a width of the first frame 3 within a plane where the light emergent surface 12 of the cover plate 1 is disposed may be smaller, that is, a narrow frame effect of the infrared touch screen 100 can be realized.

It can be understood that in a technical solution before the improvement, the first infrared filter strip 6 is only partially disposed on the side of the cover plate 1 having the first side surface 13. Particularly, the first end 61 of the first infrared filter strip 6 is connected to the first frame 3. In order to prevent jitter or displacement of the second end 62 of the first infrared filter strip 6, it is necessary to cover on the light emergent surface 12 of the cover plate 1 by the second end 62, and to use the first shielding part 35 to press the second end 62 and the cover plate 1 against the second installing part 32. The first refractive surface 632 is disposed in a region where the second end 62 is pressed by the first shielding part 35. However, the first infrared filter strip 6 has a certain deformation capability. If the second end 62 is subjected to a too great pressure in a direction perpendicular to the light emergent surface 12, the first refractive surface 632 is easy to deform, so that the first refractive surface 632 can not refract the infrared light to a predetermined direction after deforming following the second end 62. Therefore, in the solution before the improvement, a thickness of the second end 62 in the direction perpendicular to the light emergent surface 12 needs to be increased to 8 mm or more, so that the second end 62 has a sufficient resistance to pressure and deformation, thereby preventing deformation when the second end 62 is clamped and positioned. Accordingly, a gap of 8 mm or more needs to be formed between the first shielding part 35 and the light emergent surface 12 to accommodate the second end 62.

In an embodiment of the present disclosure, in order to further reduce the thickness of the protruding part of the first frame 3 relative to the light emergent surface 12, it is necessary to reduce the gap between the first shielding part 35 and the light emergent surface 12. Illustratively, as shown in FIG. 3, a third side surface parallel to the first side surface 13 is disposed on a side of the second end 62 facing the first side surface 13. The third side surface contacts the cover plate 1. Therefore, a force may be applied from both sides of the first infrared filter strip 6 in the direction parallel to the light emergent surface 12 by the third installing part 34 and the first side surface 13, so as to achieve the positioning of the first end 61 and the second end 62 of the first infrared filter strip 6. In this case, it is possible to reduce a distance between the first protruding part 63 and the light emergent surface 12 in the direction perpendicular to the light emergent surface 12 to 4 mm or less. For example, the first protruding part 63 protrudes 3 mm relative to the light emergent surface 12 in the direction perpendicular to the light emergent surface 12. Accordingly, the gap between the first shielding part 35 and the light emergent surface 12 also only needs to be 3 mm. It can be seen, according to an embodiment of the present disclosure, the thickness of the protrusion of the first frame 3 relative to the light emergent surface 12 can be further reduced.

Figure 7:
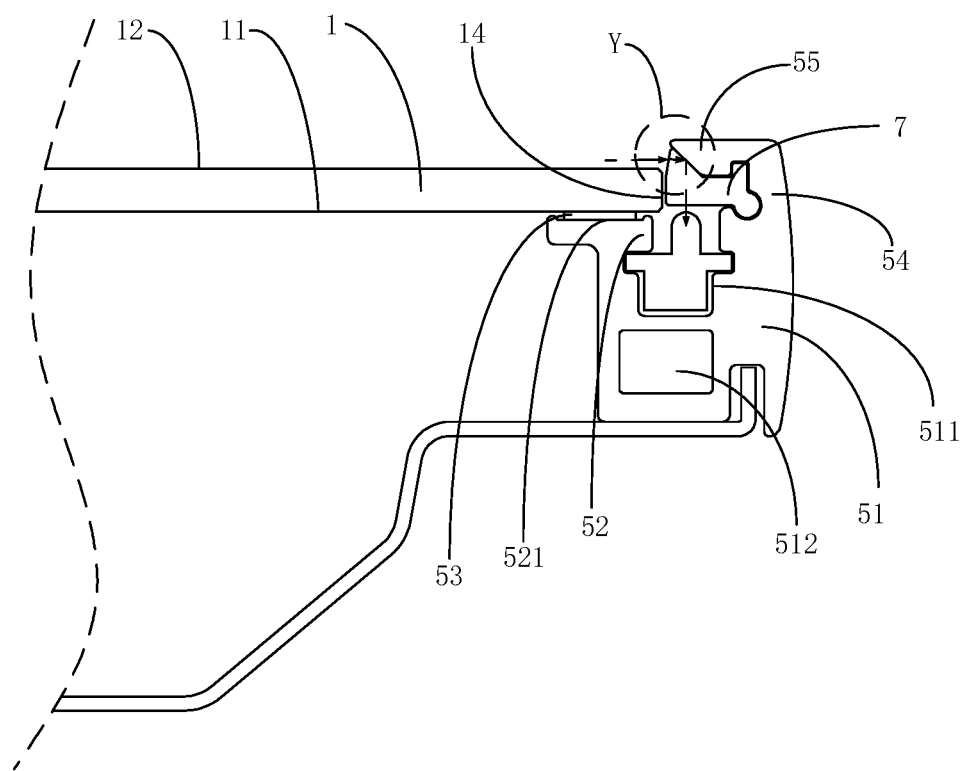
FIG. 7 is a structural schematic diagram of a side of an infrared receiver of the infrared touch screen shown in FIG. 2.

Referring to FIG. 7, FIG. 7 is a structural schematic diagram of a side of the infrared receiver in the infrared touch screen shown in FIG. 2. In order that a thickness of a protruding part of the second frame 5 relative to the cover plate 1 can be further reduced, in an embodiment of the present disclosure, the infrared receiver 4 of the infrared touch screen 100 may be disposed on a side of the cover plate 1 having the light incident surface 11. That is, the infrared receiver 4 is disposed in the in-screen space of the cover plate 1. Illustratively, the infrared touch screen 100 may also include a second infrared filter strip 7. The second infrared filter strip 7 is capable of filtering all light beams other than the infrared light directed thereto, so that only the infrared light can pass through the second infrared filter strip 7. Therefore, after at least part of the infrared light propagating parallel to the light emergent surface 12 is directed towards the second infrared filter strip 7, it can be changed in direction by an action of the infrared receiver 4 to be directed towards the infrared receiver 4.

Thus, in an embodiment of the present disclosure, the second infrared filter strip 7 enables the infrared receiver 4 disposed in the in-screen space to receive at least part of infrared light propagating in the out-of-screen space in the direction parallel to the light emergent surface 12, so as to realize a touch function of the infrared touch screen 100. It can be understood that since the infrared receiver 4 is disposed on a side of the cover plate 1 having the light incident surface 11, the thickness of the protruding part of the second frame 5 relative to the light emergent surface 12 of the cover plate 1 can be greatly reduced. The second frame 5 is for installing and fixing the infrared receiver 4.

Figure 8:
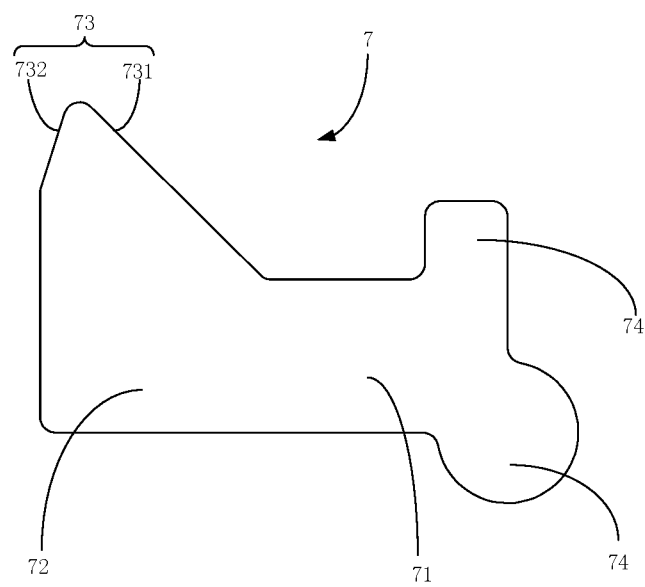
FIG. 8 is a structural schematic diagram of a second infrared filter strip in the infrared touch screen shown in FIG. 7.

Referring to FIG. 8, FIG. 8 is a structural schematic diagram of a second infrared filter strip in the infrared touch screen shown in FIG. 7. In the following, a particular structure of the second infrared filter strip 7 in an embodiment of the present disclosure will be described in further detail with reference to the accompanying drawings.

As shown in FIGS. 7 and 8, the light incident surface 11 and the light emergent surface 12 of the cover plate 1 may be connected by a second side surface 14. The light incident surface 11 and the light emergent surface 12 of the cover plate 1 are opposite. The second infrared filter strip 7 is wholly disposed on a side of the cover plate 1 having the second side surface 14. The second infrared filter strip 7 has a third end 71 and a fourth end 72. The third end 71 and the fourth end 72 are opposite. The third end 71 is connected to the second frame 5 so that the third end 71 is directly or indirectly installed and fixed to the display device by the second frame 5. The fourth end 72 is disposed on the second side surface 14. For example, the fourth end 72 may contact the second side surface 14, or there is a gap between the fourth end 72 and the second side surface 14, so that the cover plate 1 and the second infrared filter strip 7 are arranged side by side within a plane parallel to the light emergent surface 12. A second protruding part 73 is disposed on a side of the fourth end 72 facing away from the light incident surface 11. The second protruding part 73 is capable of receiving at least part of the infrared light emitted directly by the infrared light source 2 or emitted by the first protruding part 63, and directing the part of the infrared light towards the infrared receiver 4 after a direction change.

Illustratively, as shown in FIG. 8, the second protruding part 73 may have a second total reflective surface 731 and a second refractive surface 732. The second refractive surface 732 is disposed on a side of the second protruding part 73 close to the second side surface 14 and is disposed inclined to the light emergent surface 12. The second refractive surface 732 is capable of causing at least part of the infrared light propagating parallel to the light emergent surface 12 to be refracted into the second infrared filter strip 7. The second total reflecting surface 731 is disposed on a side of the second protruding part 73 away from the second side surface 14 and is arranged inclined to the light emergent surface 12. At least part of the infrared light that enters the second infrared filter strip 7 by the refraction of the second refractive surface 732 can be totally reflected, so that at least part of the infrared light totally reflected by the second total reflecting surface 731 can be directed to the infrared receiver 4.

Figure 9:
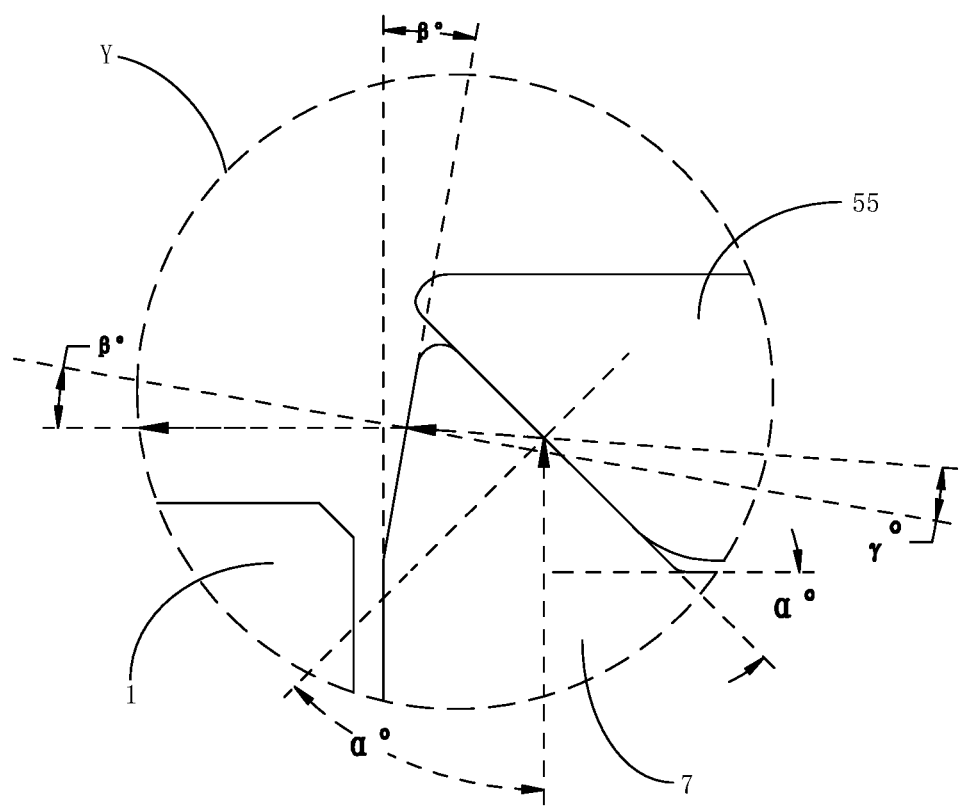
FIG. 9 is a partially enlarged view at Y of the structural schematic diagram of the side of the infrared receiver in the infrared touch screen shown in FIG. 7.

Referring to FIG. 9, FIG. 9 is a partially enlarged view at Y of a structural schematic diagram of a side of the infrared receiver in the infrared touch screen shown in FIG. 7. In an embodiment of the present disclosure, a refractive index of the second infrared filter strip 7 is assumed to be $N_2$. The light emergent surface 12 of the cover plate 1 is taken as the first reference surface, and the plane perpendicular to the first reference surface is taken as the second reference surface. For example, the second reference surface may be the second side surface 14. The second total reflective surface 731 may be disposed inclined to the first reference surface, that is, the light emergent surface 12 of the cover plate 1. An angle between the second total reflective surface 731 and the light emergent surface 12 is set to be α°. α° is greater than a total reflection critical angle of the second infrared filter strip 7, that is, $\alpha > \arcsin(1/N_2)$. An angle between the second refractive surface 732 and the second reference surface is β°.

An incident angle formed when a second initial infrared light propagating parallel to the light emergent surface 12 is directed towards the first refractive surface 632 is less than the total reflection critical angle of the second infrared filter strip 7, so that the first initial infrared light forms a second intermediate infrared light incident on the first infrared filter strip 6 after being refracted at the second refractive surface 732, and an emergence angle between the second intermediate infrared light and the second refractive surface 732 is γ°. When the second intermediate infrared light is directed towards the second total reflective surface 731, the second intermediate infrared light and the second total reflective surface 731 form an incident angle greater than α°. Therefore, after being directed towards the second total reflective surface 731, the second intermediate infrared light is totally reflected by the second total reflective surface 731 to form a third intermediate infrared light with an emergence angle α°. After emerging from the second infrared filter strip 7, the third intermediate infrared light is received by the infrared receiver 4. $N_2=\sin\beta/\sin\gamma$, $\gamma=90+\beta-2\alpha$. For example, $N_1=1.58$. After the first initial light beam is incident on the second refractive surface 732 in a direction parallel to the light emergent surface 12, infrared light towards the infrared receiver 4 in a direction perpendicular to the light emergent surface 12 can be formed by the total reflection of the second total reflective surface 731.

Of course, in an embodiment of the present disclosure, the second protruding part 73 may also include a second reflective surface and a second refractive surface 732. The second refractive surface 732 is disposed on a side of the second protruding part 73 close to the second side surface 14. The second refractive surface 732 is capable of refracting at least part of the infrared light propagating parallel to the light emergent surface 12 into the second infrared filter strip 7. The second reflective surface is disposed on a side of the second protruding part 73 away from the second side surface 14, and is provided with a reflective layer made of a reflective material such as a silver reflective thin film. At least part of the infrared light refracted by the second refractive surface 732 into the second infrared filter strip 7 can be specularly reflected, so that at least part of the infrared light specularly reflected by the second reflective surface can be directed to the infrared receiver 4.

A particular structure of the second protruding part 73 is not limited in an embodiment of the present disclosure A technical solution in which at least part of the infrared light directed by the infrared receiver 4 into the second infrared filter strip 7 is directed into the direction parallel to the light-emitting surface 12 is within the protection scope of the present disclosure.

In an embodiment of the present disclosure, as shown in FIG. 7, the second frame 5 may have a fourth installing part 51. The fourth installing part 51 is provided with a fourth sliding groove 511 with an opening towards the second infrared filter strip 7. The fourth sliding groove 511 is a through groove parallel to the light emergent surface 12 in a length direction. The infrared receiver 4 includes a second circuit board. The second circuit board is slidably connected to the fourth sliding groove 511 and is slidable in a direction parallel to the light emergent surface 12 within the fourth sliding groove 511. Therefore, in an installation process, the infrared receiver 4 can be directly slid into the fourth sliding groove 511 at an opening at an end of the fourth sliding groove 511, so that the infrared receiver 4 can be quickly installed into the fourth installing part 51. It can be seen that the infrared touch screen 100 according to an embodiment of the present disclosure has an advantage of being easy to assemble.

In an embodiment of the present disclosure, as shown in FIG. 7, the fourth installing part 51 may be provided with a second lightening hole 512 to reduce the overall weight of the infrared touch screen 100.

As shown in FIG. 7, the second frame 5 may have a fifth installing part 52. For example, the fifth installing part 52 is provided on a side of the fourth installing part 51 facing the light incident surface 11. The fifth installing part 52 is adhered to the light incident surface 11 of the cover plate 1 by a second double-sided adhesive 53.

As shown in FIG. 7, the fifth installing part 52 may be provided with a second adhesive groove 521 on a side facing the light-emitting surface 12. A side of the second double-sided adhesive 53 facing the light-receiving surface 11 is adhered to a side wall forming the second adhesive groove 521. A side of the second double-sided adhesive 53 facing the light-receiving surface 11 is adhered to the light-receiving surface 11. When a thickness of the second double-sided adhesive 53 is equal to a depth of the second adhesive groove 521, after adhesion, the cover plate 1 can be exactly pressed against a surface of the fifth installing part 52 facing the light incident surface 11, so as to prevent the second double-sided adhesive 53 causing the cover plate 1 to be locally warped relative to the fifth installing part 52.

As shown in FIG. 7, the second frame 5 may have a sixth installing part 54. The sixth installing part 54 and the fifth installing part 52 may be disposed on a same side of the fourth installing part 51, and may be symmetrically disposed on both sides of the opening of the fourth sliding groove 511. The sixth installing part 54 is provided with a second sliding groove facing the second side surface 14 of the cover plate 1. A third end 71 of the second infrared filter strip 7 is slidably installed within the second sliding groove.

As shown in FIG. 8, the third end 71 may be provided with at least two second sliding parts 74. The at least two second sliding parts 74 are different in shape. The second sliding groove may include two through grooves which are same in cross section as the two first sliding parts 64 respectively and are parallel to the light emergent surface 12 in a length direction, so that the third end 71 can slide in a direction parallel to the light emergent surface 12 within the second sliding groove. Therefore, in an installation process, the second infrared filter strip 7 can be slid directly into the second sliding groove at an opening at an end of the second sliding groove, so that the second infrared filter strip 7 can be quickly installed into the sixth installing part 54. It can be seen that the infrared touch screen 100 according to an embodiment of the present disclosure has the advantage of being easy to assemble.

In an embodiment, as shown in FIG. 8, there are two second sliding parts 74. One of the two second sliding parts 74 is circular, and the other of the two second sliding parts 74 is square. It can be understood that, in a use process, the second infrared filter strip 7 can be limited from multiple angles by forming a sliding connection with the sixth installing part 54 by two second sliding parts 74 having different shapes, so that the second infrared filter strip 7 only has a degree of freedom of sliding within the sixth installing part 54. It can be seen that in the infrared touch screen 100 according to an embodiment of the present disclosure, the second infrared filter strip 7 is more securely installed and is less prone to displacement. Finally, the change angle of the infrared filter strip to the infrared light is more accurate, so as to improve the accuracy of the infrared touch screen 100 according to an embodiment of the present disclosure.

As shown in FIG. 7, the second frame 5 may include a second shielding part 55. The second shielding part 55 is connected to an end of the sixth installing part 54 away from the fifth installing part 52. The second shielding part 55 and the infrared receiver 4 are disposed opposite to each other on both sides of the second infrared filter strip 7, so that the second shielding part 55 covers a side of the second infrared filter strip 7 facing away from the light incident surface 11 of the cover plate 1. That is, the second shielding part 55 is disposed in the out-of-screen space.

On the one hand, by the second shielding part 55, it is possible to prevent external infrared light from being incident into the second infrared filter strip 7 to some extent, so as to interfere with the operation of the infrared touch screen 100.

On the other hand, since the second infrared filter strip 7 is wholly disposed on a side of the cover plate 1 having the second side face 14, the second shielding part 55 is also wholly provided on a side of the cover plate 1 having the first side face 14. Therefore, the second shielding part 55 may not shield the cover plate 1, so that a width of the second frame 5 within a plane where the light emergent surface 12 of the cover plate 1 is disposed may be smaller, that is, a narrow frame effect of the infrared touch screen 100 can be realized.

It can be understood that in a technical solution before the improvement, the second infrared filter strip 7 is only partially disposed on the side of the cover plate 1 having the second side surface 14. Particularly, the third end 71 of the second infrared filter strip 7 is connected to the second frame 5. In order to prevent jitter or displacement of the fourth end 72 of the second infrared filter strip 7, it is necessary to cover on the light emergent surface 12 of the cover plate 1 by the fourth end 72, and to use the second shielding part 55 to press the fourth end 72 and the cover plate 1 against the fifth installing part 52. The second refractive surface 732 is disposed in a region where the fourth end 72 is pressed by the second shielding part 55. However, the second infrared filter strip 7 has a certain deformation capability. If the fourth end 72 is subjected to a too great pressure in a direction perpendicular to the light emergent surface 12, the second refractive surface 732 is easy to deform, so that the second refractive surface 732 can not refract the infrared light to a predetermined direction after deforming following the fourth end 72. Therefore, in the solution before the improvement, a thickness of the fourth end 72 in the direction perpendicular to the light emergent surface 12 needs to be increased to 8 mm or more, so that the fourth end 72 has a sufficient resistance to pressure and deformation, thereby preventing deformation when the fourth end 72 is clamped and positioned. Accordingly, a gap of 8 mm or more needs to be formed between the second shielding part 75 and the light emergent surface 12 to accommodate the fourth end 72.

In an embodiment of the present disclosure, in order to further reduce the thickness of the protruding part of the second frame 5 relative to the light emergent surface 12, it is necessary to reduce the gap between the second shielding part 55 and the light emergent surface 12. Illustratively, as shown in FIG. 7, a fourth side surface parallel to the second side surface 14 is disposed on a side of the fourth end 72 facing the second side surface 14. The fourth side surface contacts the cover plate 1. Therefore, a force may be applied from both sides of the second infrared filter strip 7 in the direction parallel to the light emergent surface 12 by the sixth installing part 54 and the fourth side surface, so as to achieve the positioning of the third end 71 and the fourth end 72 of the second infrared filter strip 7. In this case, it is possible to reduce a distance between the second protruding part 73 and the light emergent surface 12 in the direction perpendicular to the light emergent surface 12 to 4 mm or less. For example, the second protruding part 73 protrudes 3 mm relative to the light emergent surface 12 in the direction perpendicular to the light emergent surface 12. Accordingly, the gap between the second shielding part 55 and the light emergent surface 12 also only needs to be 3 mm. It can be seen, according to an embodiment of the present disclosure, the thickness of the protrusion of the second frame 5 relative to the light emergent surface 12 can be further reduced.

In an embodiment of the present disclosure, the infrared light source 2 may be provided on the side of the light incident surface 11 of the cover plate 1, and the infrared receiver 4 may be provided on the side of the light emergent surface 12 of the cover plate 1, so that the thickness of the protrusion of the first frame 3 of the infrared touch screen 100 relative to the light emergent surface 12 is less than the thickness of the protrusion of the second frame 5 relative to the light emergent surface 12. Alternatively, the infrared receiver 4 may be provided on the side of the light incident surface 11 of the cover plate 1, and the infrared light source 2 is provided on the side of the light emergent surface 12 of the cover plate 1, so that the thickness of the protrusion of the first frame 3 of the infrared touch screen 100 relative to the light emergent surface 12 is greater than the thickness of the protrusion of the second frame 5 relative to the light emergent surface 12. Alternatively, as shown in FIG. 2, both the infrared light source 2 and the infrared receiver 4 are provided on the side of the light incident surface 11 of the cover plate 1, so that the thickness of the protrusion of the first frame 3 relative to the light emergent surface 12 and the thickness of the protrusion of the second frame 5 relative to the light emergent surface 12 are both reduced.

In an embodiment of the present disclosure, on one hand, at least part of the infrared light emitted by the infrared light source 2 into the first infrared filter strip 6 can be directed outside the cover plate towards the second protruding part 73 by the first protruding part 63, and at least part of the infrared light emitted from the infrared light source 2 into the first infrared filter strip 6 can be directed inside the cover plate 1 towards the second protruding part 73 by the first protruding part 63. On the other hand, at least part of the infrared light directed outside the cover plate 1 towards the second protruding part by the first protruding part 63 can be received by the second protruding part 73, and to the infrared receiver 4, and at least part of the infrared light directed inside the cover plate by the first protruding part 63 towards the second protruding part 73 can be received and directed towards the infrared receiver 4 by the second protruding part 73. The infrared receiver 4 is capable of detecting an intensity of the received infrared light.

In this case, the infrared touch screen 100 may further include a processor. The processor is connected to the infrared light source 2 and the infrared receiver 4 respectively. The processor is configured to be capable of perform following actions: controlling the infrared light source 2 to emit infrared light; controlling the infrared receiver 4 to detect an actual intensity of the infrared light; comparing the actual intensity of the infrared light with a preset intensity, and giving an alarm if the actual intensity of the infrared light is less than the preset intensity.

It can be understood that when the display device is used in a place with severe oil pollution such as kitchen, for example, when the display device is provided on an integrated stove, the surface of the cover plate 1 easy to quickly adhering a layer of oil stain to form dirt. Part of the dirt on the cover plate 1 is not easy to detect. If all possible dirt needs to be removed, it is necessary to clean the light surface 12 of the cover plate 1 completely. However, when the area of the cover plate 1 is large, most users do not wish to clean the cover plate 1 completely after using the integrated stove considering the high workload of cleaning the cover plate 1.

In an embodiment of the present disclosure, when dirt stain is formed on the surface of the cover plate 1, the dirt stain blocks infrared light propagating on the surface of the cover plate 1, but cannot block infrared light propagating inside the cover plate 1.

At this time, assuming that the preset intensity in the processor includes a first preset intensity, the first preset intensity is an intensity of the infrared light when the infrared receiver 4 can receive only at least part of the infrared light directed inside the cover plate 1 by the first protruding part 63 towards the second protruding part 73 and directed towards the infrared receiver 4. If the actual intensity received by the infrared receiver 4 is less than or equal to the preset intensity and is not zero, the processor gives an alarm indicating a region of the cover plate 1 corresponding to the infrared receiver 4 is dirty, so that the user may clean only the part without cleaning the entire cover plate 1. Further, the workload of a single cleaning operation of the user is reduced. If the actual intensity received by the infrared receiver 4 is less than or equal to the preset intensity and is zero, the processor gives an alarm indicating that the infrared receiver 4 or the infrared light source 2 is damaged and needs timely maintenance.

Of course, the preset intensity may also include a second preset intensity. The second preset intensity is an intensity of the infrared light detected when the infrared receiver 4 can receive all infrared light that finally directed inside the cover plate 1 into the infrared receiver 4 by the first protruding part 63, and when the infrared receiver 4 can receive at least part of the infrared light finally directed outside the cover plate 1 into the infrared receiver 4 by the first protruding part 63. Therefore, when the cover plate 1 is dirty to a certain extent, an alarm can be given in time to remind the user to clean the cover plate 1 so as not to affect a normal touch control function. That is, according to an embodiment of the present disclosure, it is unnecessary for the user to clean the cover plate 1 after each use of the integrated stove, so as to reduce the number of cleaning times of the user.

In an embodiment of the present disclosure, the processor may be connected to the liquid crystal module 200 of the display device, and a warning mark is formed at a corresponding position of the cover plate 1 by the liquid crystal module 200 to remind the user. For example, the processor controls the liquid crystal module 200 to form blue light at the dirty position of the cover plate 1 and white light at the non-dirty position of the cover plate 1.

In an embodiment of the present disclosure, as shown in FIG. 2, the display device may further include a back plate 400. The back plate 400 is provided on a side of the light incident surface 11 of the cover plate 1. The first frame 3 and the second frame 5 are both provided with installing grooves on a side away from the cover plate 1. One end of the back plate 400 is inserted into the installing groove of the first frame 3 to be fixed and connected to the first frame 3, and the other end of the back plate 400 is inserted into the installing groove of the second frame 5 to be fixed and connected to the second frame 5.

In the above-mentioned embodiments, the description of each embodiment has its own emphasis, and parts not described in detail in a certain embodiment may be referred to the related description of other embodiments.

In the description of this application, the terms "first" and "second" are used for descriptive purposes only and are not to be construed as indicating or implying relative importance or implying the number of indicated technical features. Therefore, the features limited by "first" and "second" may explicitly or implicitly include one or more features.

Embodiments of the present disclosure have been described in detail, and particular examples have been used herein to illustrate the principles and embodiments of the present disclosure. The description of the above embodiments is merely for helping to understand the method of the present disclosure and the core concepts thereof. At the same time, for those skilled in the art, there may be changes in the particular implementation methods and application scope based on the ideas of the present disclosure. In summary, the present description should not be construed as limiting the application.

What is claimed is:

1. An infrared touch screen, comprising:
    a cover plate having a light incident surface and a light emergent surface, wherein the light incident surface and the light emergent surface are oppositely disposed, and are connected by a first side surface;
    an infrared light source on a side of the light incident surface of the cover plate, wherein the infrared light source is for emitting infrared light;
    a first frame; and
    a first infrared filter strip on a side of the first side surface of the cover plate, wherein the first infrared filter strip has a first end and a second end opposite to the first end, the first end is connected to the first frame, the second end on the first side surface has a first protruding part on a side facing away from the infrared light source, and at least part of infrared light emitted by the infrared light source into the first infrared filter strip is directed in a direction parallel to the light emergent surface by the first protruding part;
    wherein the first end of the first infrared filter strip comprises at least two first sliding parts, the at least two first sliding parts are slidably connected to the first frame, and are different in shape.

2. The infrared touch screen of claim 1, wherein the first protruding part comprises:
    a first total reflective surface on a side of the first protruding part away from the first side surface, wherein the at least part of the infrared light emitted by the infrared light source into the first infrared filter strip is totally reflected towards the cover plate by the first total reflective surface; and
    a first refractive surface between the first total reflective surface and the first side surface, wherein at least part of the infrared light totally reflected by the first total reflective surface is refracted by the first refractive surface to emerge from the first infrared filter strip in the direction parallel to the light emergent surface.

3. The infrared touch screen according to claim 2, wherein the first frame has a first shielding part, the first shielding part is disposed on a side of the first infrared filter strip facing away from the infrared light source, and is wholly disposed on a side of the first side surface of the cover plate.

4. The infrared touch screen according to claim 1, wherein the first frame has a first installing part, the first installing part has a third sliding groove with an opening towards the first infrared filter strip, and the third sliding groove is a through groove parallel to the light emergent surface in a length direction.

5. The infrared touch screen according to claim 4, wherein the first installing part has a first lightening hole.

6. The infrared touch screen according to claim 4, wherein the first frame has a second installing part, the second installing part is disposed on a side of the first installing part facing the light incident surface, and the second installing part is adhered to the light incident surface by a first double-sided adhesive.

7. The infrared touch screen according to claim 6, wherein the second installing part has a first adhesive groove on a side facing the light incident surface, a side of the first double-sided adhesive facing away from the light incident surface is adhered to a side wall forming the first adhesive groove, and a side of the first double-sided adhesive facing the light incident surface is adhered to the light incident surface.

8. The infrared touch screen according to claim 6, wherein the first frame has a third installing part, the third installing part and the second installing part are disposed on a same side of the first installing part, the third installing part and the second installing part are symmetrically disposed on both sides of the opening of the third sliding groove, the third installing part has a first sliding groove facing the first side surface, and the first end is slidably installed within the first sliding groove.

9. The infrared touch screen according to claim 1, wherein the second end has a third side surface on a side facing the first side surface, the third side surface is parallel to the first side surface, and the third side surface contacts the cover plate.

10. The infrared touch screen according to claim 1, wherein the light incident surface and the light emergent surface are further connected by a second side surface opposite to the first side surface,
the infrared touch screen further comprising:
an infrared receiver on a side of the light incident surface of the cover plate;
a second frame; and
a second infrared filter strip on a side of the second side surface of the cover plate, wherein the second infrared filter strip has a third end and a fourth end opposite to the third end, the third end is connected to the second frame, the fourth end is disposed on the second side surface, the fourth end has a second protruding part on a side facing away from the infrared receiver, the second protruding part receives at least part of the infrared light emitted by the first protruding part in a direction parallel to the light emergent surface, and direct at least part of the received infrared light to the infrared receiver.

11. The infrared touch screen of claim 10, wherein the second protruding part comprises:
a second refractive surface on a side of the second protruding part close to the second side surface, wherein at least part of the infrared light directed by the first protruding part is refracted into the second infrared filter strip; and
a second total reflective surface on a side of the second protruding part away from the cover plate, wherein at least part of the infrared light refracted by the second refractive surface is totally reflected to the infrared receiver.

12. The infrared touch screen according to claim 11, wherein the second frame comprises a second shielding part, the second shielding part is disposed on a side of the second infrared filter strip facing away from the infrared receiver, and the second shielding part is disposed on a side of the second side surface of the cover plate.

13. The infrared touch screen according to claim 10, wherein the third end of the second infrared filter strip comprises at least two second sliding parts, the at least two second sliding parts are slidably connected to the second frame, and are different in shape.

14. The infrared touch screen according to claim 10, wherein at least part of the infrared light emitted by the infrared light source into the first infrared filter strip is directed outside the cover plate to the second protruding part by the first protruding part;
at least a part of infrared light directed outside the cover plate by the first protruding part to the second protruding part is received and directed towards the infrared receiver by the second protruding part; and
the infrared receiver detects an intensity of the received infrared light.

15. The infrared touch screen of claim 14, further comprising a processor, wherein the processor is connected to the infrared light source and the infrared receiver respectively,
the processor is configured to:
control the infrared light source to emit infrared light;
control the infrared receiver to detect an actual intensity of infrared light;
compare the actual intensity of the infrared light with a preset intensity, and gives an alarm when the actual intensity of the infrared light is less than or equal to a preset intensity.

16. The infrared touch screen according to claim 10, wherein the second frame has a fourth installing part, wherein and the fourth installing part has a fourth sliding groove with an opening towards the second infrared filter strip, the fourth sliding groove is a through groove parallel to the light emergent surface in a length direction.

17. The infrared touch screen according to claim 10, wherein the fourth end has a fourth side surface on a side facing the second side surface, the fourth side surface is parallel to the second side surface, and the fourth side surface contacts the cover plate.

18. A display device, comprising an infrared touch screen, wherein the infrared touch screen, comprises:
a cover plate having a light incident surface and a light emergent surface, wherein the light incident surface and the light emergent surface are oppositely disposed, and are connected by a first side surface;
an infrared light source on a side of the light incident surface of the cover plate, wherein the infrared light source is for emitting infrared light;
a first frame; and
a first infrared filter strip on a side of the first side surface of the cover plate, wherein the first infrared filter strip has a first end and a second end opposite to the first end, the first end is connected to the first frame, the second end on the first side surface has a first protruding part on a side facing away from the infrared light source, and at least part of infrared light emitted by the infrared light source into the first infrared filter strip is directed in a direction parallel to the light emergent surface by the first protruding part;
wherein the first end of the first infrared filter strip comprises at least two first sliding parts, the at least two first sliding parts are slidably connected to the first frame, and are different in shape.

* * * * *